May 27, 1958 P. J. DAHL 2,835,954
HOSE CLAMP
Filed March 28, 1955
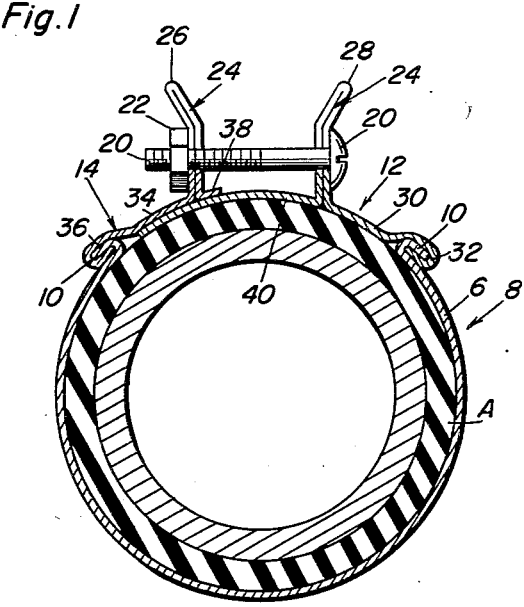
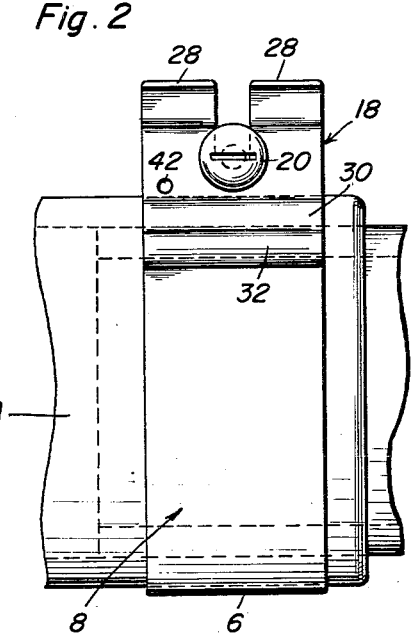
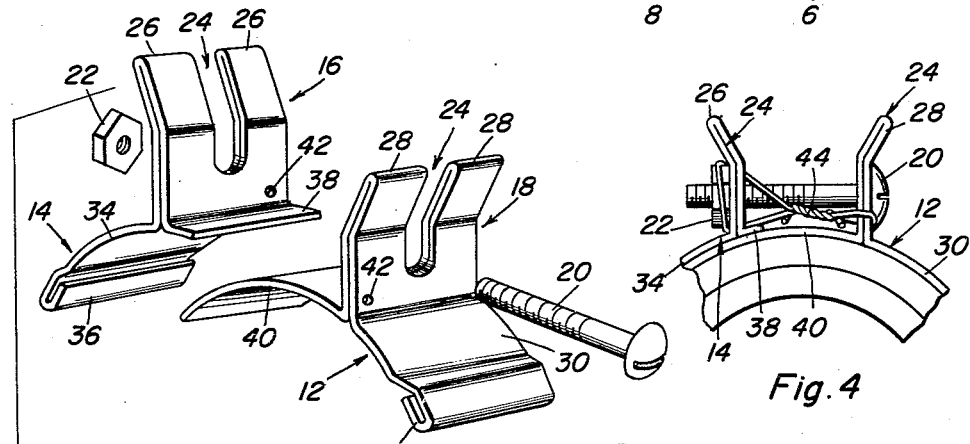
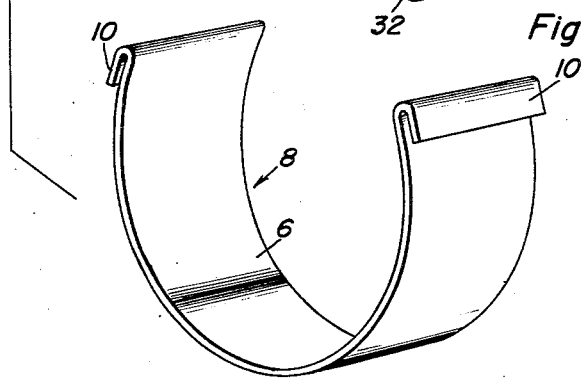
Philip J. Dahl
INVENTOR.
BY *Clarence A. O'Brien*
*and Harvey B. Jackson*
Attorneys

United States Patent Office 2,835,954
Patented May 27, 1958

2,835,954

HOSE CLAMP

Philip J. Dahl, Tampa, Fla.

Application March 28, 1955, Serial No. 497,205

1 Claim. (Cl. 24—279)

The present invention relates to an improved sectional-type hose clamp, that is, a clamp which is characterized by a main section, a pair of ancillary sections, the latter having overlapping portions and terminal hook portions interlocked with companion hooks on the ends of the main section.

An object of the invention is to structurally, functionally and otherwise improve upon similarly constructed and performing sectional clamps, whether they be used on pipes, hose sections or otherwise, and, having pursued the ideas of the instant invention, to provide a clamp which will meet the practical manufacturing requirements of manufacturers, general expectations of retailers, and the essential needs and purposes of various users.

Another object of the invention is to provide a clamp having the structural characteristics touched upon in the opening statement of the invention and characterized by an arrangement wherein the ancillary sections are provided with bifurcated members which function as complemental lugs, the respective pairs of furcations of the respective lugs serving to accommodate cooperating end portions of a nut-equipped bolt, said bolt being readily insertable and removable and the ancillary sections being separable from each other and from the hooked end portions of the main section so as to thus provide a clamp which is readily applicable and removable, using, under ordinary circumstances, a screwdriver and a pair of pliers.

Objects, features and advantages in addition to those specifically set forth will become more readily apparent from the following description and the accompanying sheet of drawings.

In the drawings, wherein like numerals are employed to designate like parts throughout the views:

Figure 1 is a view in section and elevation showing the improved clamp and the manner in which it is specifically constructed and applied;

Figure 2 is a side elevation, that is, a view in elevation looking at Figure 1 in a direction from right to left;

Figure 3 is an exploded perspective view; and

Figure 4 is a fragmentary elevational view which is provided here to show the twisted safety retaining wire which is sometimes employed.

In the drawings and with special reference to Figure 3, it will be seen that the main stirrup-like section takes the form of a band 6 of three-quarter circular form, and this section is denoted by the numeral 8. The free ends are provided with return bends defining broad anchoring and retaining hooks 10 at the respective ends. The ancillary sections are here denoted by the numerals 12 and 14, respectively, and 12 denotes a first ancillary section and 14 the second ancillary section. Both sections are arcuate and are provided with bolting and clamping lugs 16 and 18 which serve to accommodate the threaded bolt 20 and assembling and retaining nut 22. Specifically, each lug is bifurcated, as at 24, to define spaced parallel branches or furcations with the free end portions of the latter bent and flared outwardly and away from each other, as at 26 and 28, respectively. Thus, these lugs serve to accommodate the insertable and removable bolt and nut and render the latter readily applicable and removable.

Each section 12 or 14, as the case may be, is in the form of an arcuate metal strap which is of the same width as the band 6. Take, for example, the strap end 30 of the section 12 which has an inbent bend which defines an attaching and retaining hook 32 which is releasably interlocked with the right hand hook 10 in Figure 3. The corresponding end portion 34 of section 14 has an inbent terminal or bend which also constitutes an attaching and retaining hook 36 which is releasably interlocked with the left hand hook 10. The inner end portions of these respective straps, one of which is short as at 38, overlaps the longer portion 40 for reliable and firm mechanical relationship, as is evident, for example, in Figure 1. While it is in the purview of the invention to form the lugs separately and weld them on these arcuate ancillary sections 14 and 12, it is preferred that each section be made from a single strap of metal which is bent between its ends to define the outstanding portions which are bifurcated and thus transformed into the stated bolt and nut accommodating lugs.

Novelty is thought to reside in a sectional hose clamp characterized by a main and auxiliary or ancillary sections, of which there are three, with the ancillary sections having overlapping portions and hooked end portions and interlocked with the hooked terminal portions of the main section. Further novelty is predicated on the bifurcated lugs which are either integral with or separate from the sections 12 and 14, in conjunction with the readily insertable and removable nut-equipped bolt. Thus, when the structure is set up for use, the two sections 12 and 14 are slid into position and hooked in place with the ends 38 and 40 overlapping. This provides the lugs and then, the nut 22 is applied to the threaded end of the bolt and is slipped easily into place, after which the nut is tightened to clamp the bolt securely and to draw the lugs toward each other and consequently, to tightly wrap or clamp the free sections around a hose A or other equivalent part, in the manner shown in Figures 1 and 2.

The holes 42 in lugs 16 and 18 serve to accommodate an optionally usable safety wire 44 which is laced and twisted, as shown in Figure 4.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claim.

What is claimed as new is as follows:

A hose clamp comprising a main generally circular section embodying a band having spaced apart ends, said ends each terminating in a return bend and the two return bends being directed to define outwardly disposed open-ended assembling and retaining hooks, a first auxiliary section comprising an arcuate strap bent upon itself intermediate its ends to provide a lateral lug and said lug being bifurcated, said first auxiliary section having a bend at one end to provide a hook which is releasably interlocked with an adjacent one of the first named hooks, the other end of said strap being directed toward and terminating in close spaced parallelism in respect to the remaining one of the first named hooks, and a second auxiliary section also in the form of a strap bent upon itself intermediate its ends to provide a lug and said lug being bifurcated, said second auxiliary section having a bend at an outer end providing an inwardly bent hook which is releasably engaged with the adjacent one of the first named hooks, said strap being relatively short compared to the first named strap and overlapping the same, said lugs being thus disposed in spaced apart relationship and adapted to accommodate a bolt and nut assembly.

References Cited in the file of this patent

UNITED STATES PATENTS

| | | |
|---|---|---|
| 809,756 | Staude | Jan. 9, 1906 |
| 1,187,430 | Kenly | June 13, 1916 |
| 1,274,689 | Cooper et al. | Aug. 6, 1918 |
| 1,419,897 | Palmer | June 13, 1922 |
| 1,584,498 | Vitek | May 11, 1926 |
| 1,596,944 | Philbrook | Aug. 24, 1926 |
| 1,629,246 | Arrington | May 17, 1927 |
| 1,684,666 | Frazier | Sept. 18, 1928 |
| 1,907,889 | Stauffer | May 9, 1933 |
| 2,359,418 | Hartman | Oct. 3, 1944 |